United States Patent Office 3,531,643
Patented Sept. 29, 1970

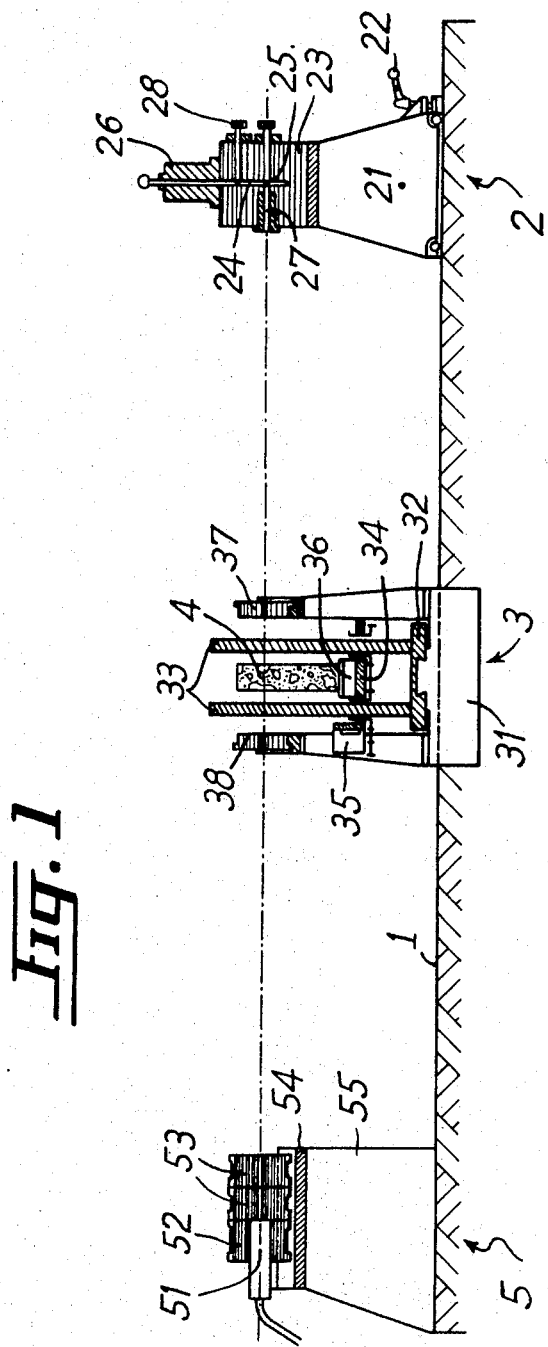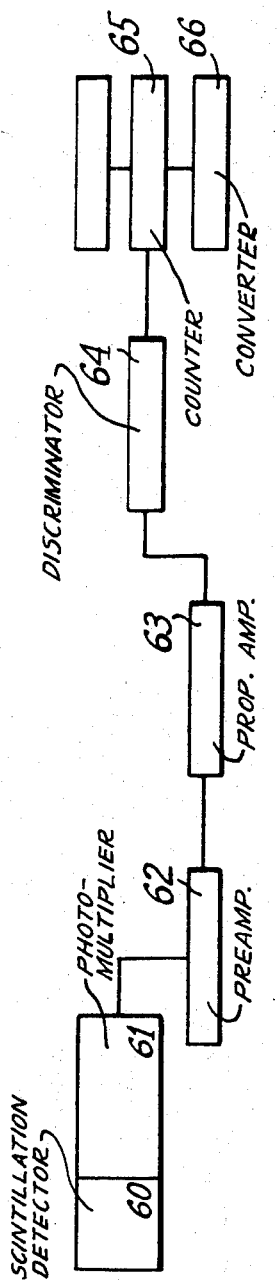

3,531,643
METHOD AND APPARATUS FOR MEASURING APPARENT DENSITY BY GAMMA RADIATION
Serge Bretonniere, Chatillon-sous-Bagneux, Jean-Pierre Chevrier, Fontenay-aux-Roses, and Yves Gabilly, Angers, France, assignors to Etat Francais, represente par le Ministere de l'Equipement, Laboratoire Central des Ponts et Chaussees, Paris, France
Filed Oct. 26, 1967, Ser. No. 678,401
Claims priority, application France, Nov. 25, 1966, 85,123
Int. Cl. G01t 1/16
U.S. Cl. 250—83.3    5 Claims

ABSTRACT OF THE DISCLOSURE

A method and apparatus for measuring the apparent density of a solid body by gamma rays. An emitter of an incident beam of gamma rays is mounted on a frame with an adjustable support for the sample to be measured placed on the axis of the emitted beam and a receiver for the emergent beam placed after the support on the same axis; adjustable collimating means are placed between the emitter and the sample support for forming the incident beam into a narrow pencil of substantially parallel rays in the axis of the incident beam; and a discriminating device is incorporated with the receiver to determine the energy of the photons received thereby.

---

The present invention relates to the determination of the density of a material, effected on a sample taken from the material or on a test piece made in the laboratory.

Known methods for measuring the apparent density of a body require a measurement of the weight and a measurement of the volume, the latter being made from the dimensions of the test piece or by means of a hydrostatic balance. For the weighing operation on the hydrostatic balance, it can be necessary, if, as is often the case, the body is porous, to render its outer surface impermeable by coating it with a layer of paraffin wax.

Moreover, whatever be the manner of determining the volume, these known methods do not enable density variations at one point or another in the test piece to be easily evaluated. It is only possible to obtain an approximate idea by cutting the latter, which is a long and tedious operation because the measurement must be repeated on each portion. In addition to the length of the measurement being increased with this method, the sources of error are more numerous.

Thus, the known methods requiring a minimum of two measurements are not very suitable for the measurement of the apparent density of a very small portion of material, and, consequently to the study of density variations along a test piece either.

It has already been proposed to use for this type of measurement, a beam of gamma rays emitted by a radioactive source and passing through the material. The emerging radiation is received by a receiver placed in the axis of the beam. The number of gamma photons received, first in the absence and then in the presence of the test piece of material considered, is then compared.

However, this method has the inconvenience of recording at the same time both photons of incident energy which have passed through the material without interaction therewith, and photons diffused by the material; in effect certain photons which are propagated in the material interact with the electrons of different elements which they encounter.

This interaction is manifested, either by total absorption of the photon or by a diffusion of the latter due to the Compton effect, in a direction making a certain angle with the incident direction; the energy of the diffused photon is less than the energy of the incident photon and depends on the angle of diffusion.

The receiver thus receives these diffused photons as well as those which have passed through the material without interaction.

The number $N_1$ of photons passing through a material without interaction is related to the number $N_0$ of photons emitted by the source according to the formula:

$$N_1 = N_0 e^{-\mu' \gamma d}, \text{ where,}$$

$\mu'$ is the coefficient of absorption of the mass of material for the incident energy,
$\gamma$ is the apparent mass per unit volume of the material,
$d$ is the thickness of the material through which the rays pass.

It will be seen from the forgoing formula that a measurement of the number of photons emitted and the number of photons passing through the material whilst substantially preserving their incident energy enables a precise determination of the density to be made. In practice, the inevitable reception of photons diffused by the material at the same time as photons of incident energy introduces an error into this measurement.

Moreover, when the energy of the diffused photons becomes less than about 0.6 mev., their absorption varies with the chemical nature of the material through which they pass, which gives rise to additional error in the results.

According to the invention, it is proposed to make use of the advantages of density measurements by means of gamma radiation, whilst limiting as far as possible the inconvenience due to the reception of diffused photons.

According to one object of the invention, there is sought a measurement of the density of the material in a particularly rapid manner on samples, and in various zones of the samples; it aims also at determining the density gradient along a given sample.

Another object of the invention is to render the measurement as independent as possible from the influence of the chemical nature of the material through which the rays pass.

Another object of the invention is to register only a minimum of diffused photons.

The present invention thus provides a method of measuring the apparent density of a material on a sample thereof in which an incident beam of gamma rays is directed on to the sample and at least a part of the corresponding emergent beam is received, characterized in that only photons whose trajectory is actually in the axis of the incident beam and of which the energy is greater than a predetermined level are retained in the emergent beam with a view to their measurement.

According to another characteristic, only the photons whose energy is included within a determined range are retained.

According to another characteristic of the measuring apparatus, the sample support is movable with respect to the axis of the incident beam.

According to another characteristic, the receiver is essentially constituted by a scintillator and a photo-multiplier tube.

Finally, the invention includes a particular use of a measuring apparatus having a sample support movable with respect to the axis of the incident beam, which use consists in causing a sample of material to be explored in continuous manner by the said incident beam, and displacing the sample support with respect to the said beam in order to determine the density gradient.

Thus, the method which has just been defined enables density measurements using gamma radiation to be effected very rapidly in a very large number of zones of a sample; moreover by virtue of the narrowness of the beams used and of the precision of the method, the density gradient of a heterogeneous sample can be made by continuous displacement of the latter.

The precision of the method results primarily from the almost total elimination of recordal by the receiver of photons diffused by the material.

This elimination is realised in two ways:

First of all it is known that the photons are diffused by the material in a direction making a certain angle with their incident direction, and thus the great majority of photons collected in the axis of the incident beam are not subjected to diffusion, and this applies all the more the narrower the incident beam is itself. The delimitation of the pencils of gamma rays is however limited by the necessity to direct a number of photons to the receiver, which is sufficient, taking into account the sensitivity of the latter.

It is also known that the diffused photons lose a quantity of energy at each diffusion, and consequently the influence of the diffused photons will be eliminated by retaining for measurement purposes only the photons whose energy is greater than a certain level, which level is to be determined particularly as a function of the energy of the photons emanating from the emitter.

It is important that the energy of the radiation used should be between 0.6 and 2 million electronvolts (mev.) in order that the inter-actions of the photons with the material shall be essentially due to the Compton effect; it is known that in this case the absorption of diffused photons does not vary with the chemical nature of the material.

Thus, with regard to the measuring apparatus, there is employed as the gamma radiation emitter a substantially pin point radioactive source; it can advantageously be of Cesium 137 or Cobalt 60, and preferably Cesium 137 whose radiation energy is 0.67 mev., giving a greater period, and necessitating a smaller thickness of lead for protecting personnel.

Generally speaking, the activity to be chosen also depends on the measurement time and desired precision. For the applications envisaged, it can vary from 20 to 250 millicuries without these parameters being limitative.

The collimation of the beams is effected at both sides of the test piece by lead plates having openings whose size is determined as a function of the structure of the material constituting the test piece (and where this is not possible, as a function of its granularity). For a crystal scintillator of an inch and a half (3.8 cm.), the diameter of the plates can vary from a few millimetres to about 4 centimetres. The photons having passed through the plate are received by a scintillation counter associated with a photomultiplier tube.

The receiver delivers pulses of amplitude proportional to the energy of the photons received; these pulses are received in a processing assembly which performs the operations of amplification, discrimination or selection of amplitude, counting, integration and recordal of the results.

There is meant by discrimination the retaining only of photons whose energy is greater than a certain level, and by selection of amplitude, the retaining of photons whose energy is included within a predetermined range.

One embodiment of the measuring apparatus is described hereunder, by way of example, with reference to the accompanying drawing in which FIG. 1 shows a view with partial sections of the apparatus, and FIG. 2 is a diagram of the assembly for treating the data provided.

The measuring apparatus consists of a horizontal supporting frame 1, an emitter 2, a sample support 3, the sample itself being represented at 4, and a receiver 5.

The emitter consists of a base 21, movable on the supporting frame 1, provided with a locking lever 22, and supporting a lead block 23; the latter has a vertical bore 24 for the introduction of a substantially pin point radioactive source 25 of Cesium 137, from a transport container 26. The source 25, placed at the level of a horizontal collimation bore 27, is held in position by a locking screw 28.

Moreover, the measuring apparatus is equipped with collimators (not shown) which are cylinders of lead axially bored to different diameters, and adapted to be placed at will in the axis of the collimating bore 27 (the axis of the beam).

The sample support 3 is adapted to move the sample 4 in the beam of photons emanating from the emitter 2, the section of which beam is a function of the plates used and of the distance of the source 25 from the sample 4.

This distance is obtained by manual displacement of the frame of the sample support assembly 3 connected to a carriage 31. A further carriage 32 enables the sample 4 to be moved transversally under manual control. It has two screw columns 33 along which a platform 34 can be vertically displaced.

The vertical movements of the platform 34 are obtained by an electric motor and a gear box 35 providing a wide range of fixed speeds enabling one trial or another to be very accurately reproduced.

A sight facilitates the centering of the sample 4 on the platform 34, the movements of which are connected to verniers (not shown) which indicate the zone of the sample 4 which is subjected to the photon beam.

For certain samples, it is advantageous to move them in the beam whilst subjecting them to a helicoidal movement. The latter is obtained by a combination of automatic vertical movement and a rotational movement by a rotatable platform 36 driven at different speeds according to the circumstances by interchangeable electric reduction motors.

In order to define accurately the surface of the sample subjected to radiation, an apertured plate 37 rigidly mounted on the carriage 31 very near to the platform, defines the sectional area of the incident beam. An identical apertured plate 38 limits the section of the beam transmitted to the receiver assembly.

The receiver 5 includes a scintillation detector 51 disposed at the centre of a lead cylinder 52. Plates 53 have central apertures to enable the beam received from the sample 4 to be collimated before transmission to the detector 51 as a pencil of substantially parallel rays along the axis of the collimation bore 27. These plates rest in a V block 54 supported by a base 55 rigidly fixed to the frame 1.

The elements constituting the receiver 51 are diagrammatically shown in FIG. 2.

The scintillation detector 51 comprises a crystal scintillator 60 of sodium iodide associated in known manner with a photomultiplier 61, the principle of these devices being described for example in "Scintillation Counter," by J. B. Biks, edited by Pergamon Press, Oxford, N.Y.

The electric pulses leaving the detector 51 pass to a preamplifier 62, which constitutes an impedance matching device, and then are amplified by a proportional amplifier 63 and received by a discriminator 64 which eliminates all the pulses whose amplitude is lower than a given level corresponding to an energy level for the detected photons. If it is desired to count only the photons whose energy is included within a given range, a selective discriminator is provided constituted for example by a quadripole.

The emanating pulses are counted by a counter 65 followed by a digital analogue converter 66 of known construction.

The samples may or may not be constituted by coherent material; if they are not coherent, the materials are contained in a mold. It will be observed that the apparatus can receive samples of considerable dimensions and weight.

A measuring operation is carried out as follows:

The measuring apparatus should be adjusted first of all, the geometry of the beam being fixed by the different plates and their respective positions, these members are optically aligned so that they may be displaced one with respect to the others in a horizontal direction.

The number of photons $N_0$ received by the scintillator 51 in the absence of the sample 4 can then be measured.

The density measurement necessitates a precise knowledge of the thickness of the material traversed, and the sample 4 should have a simple geometric form such as a cylinder or parallelepiped for example.

After the sample 4 has been centered on the sample support 3, a measurement of the number $N_1$ of photons received can be performed, and since the thickness D and the coefficient of absorption $\mu'$ of the material is known the value $\gamma$ of the mass per unit volume can be accurately obtained.

Such measurements can be carried out in a discontinuous manner so that the apparent density of the sample at different levels can be determined, or in a continuous manner, at constant speed which is adjusted before hand; the platform 36 which supports the sample 4 can be driven in a vertical translational movement, or a rotational movement about a vertical or horizontal axis perpendicular to the incident pencil, assuming that the latter is horizontal. The two movements can be combined enabling curves of variation of apparent density to be obtained over the whole length of the test piece, by integrating and recording the pulses delivered by the detector system.

Finally, it will be realised that variants of the application of the method thus described, as well as of the measuring apparatus and its use can be envisaged without departing from the scope of the present invention.

What we claim is:

1. An apparatus for measuring the apparent density of a selected portion, of substantially uniform thickness, of a sample of material, comprising a supporting frame, an emitter of an incident narrow beam of gamma rays directed along an axis, a sample support disposed to position said selected portion on said axis, and a receiver for the emergent beam disposed in the same axis, characterized in that the apparatus includes adjustable means between the emitter and the sample support for collimating the incident beam into a narrow pencil of rays; adjustable means for collimating the emergent beam reaching the receiver from a sample on said support into a very narrow pencil of practically parallel rays in the axis of the incident beam, at least one discriminating element for determining the energy of the photons received by the receiver; and a perforated plate mounted on each side of and in proximity to the sample with the perforations embracing said axis.

2. An apparatus according to claim 1 wherein the emitter is constituted by a substantially pinpoint radioactive source housed in a block of lead and a collimating passage in said block, defining said axis.

3. An apparatus according to claim 1 wherein the radio-active source is one of the substances within the group comprising Cobalt 60 and Cesium 137.

4. An apparatus according to claim 1 wherein the receiver comprises a scintillation detector associated with a photomultiplier tube, connected to an amplitude discriminating device for determining the energy of the pulses delivered by the photomultiplier tube.

5. An apparatus according to claim 1 wherein the sample support is movable relative to said axis.

References Cited

UNITED STATES PATENTS

| | | | |
|---|---|---|---|
| 2,881,327 | 4/1959 | Hendee et al. | 250—51.5 X |
| 3,100,841 | 8/1963 | Reider | 250—83.3 X |
| 3,127,514 | 3/1964 | Sharp et al. | 250—105 |
| 3,132,247 | 5/1964 | Wright | 250—83.3 |
| 3,243,589 | 3/1966 | Sinclair | 250—83.3 X |

ARCHIE R. BORCHELT, Primary Examiner

D. L. WILLIS, Assistant Examiner

U.S. Cl. X.R.

250—105